(12) United States Patent (10) Patent No.: US 10,699,583 B2
Kao (45) Date of Patent: Jun. 30, 2020

(54) METHOD FOR FLIGHT PATH PLANNING OF UNMANNED AERIAL VEHICLES USING FLYING ROUTES OF BIRDS

(71) Applicant: Shu-Hui Kao, Taichung (TW)

(72) Inventor: Shu-Hui Kao, Taichung (TW)

( * ) Notice: Subject to any disclaimer, the term of this patent is extended or adjusted under 35 U.S.C. 154(b) by 237 days.

(21) Appl. No.: 16/027,981

(22) Filed: Jul. 5, 2018

(65) Prior Publication Data

US 2020/0013296 A1    Jan. 9, 2020

(51) Int. Cl.
*G08G 5/00* (2006.01)
*G05D 1/00* (2006.01)
*G05D 1/02* (2020.01)
*B64C 39/02* (2006.01)

(52) U.S. Cl.
CPC ......... *G08G 5/0034* (2013.01); *B64C 39/024* (2013.01); *G05D 1/0088* (2013.01); *G05D 1/0202* (2013.01); *G08G 5/0069* (2013.01); *B64C 2201/127* (2013.01); *B64C 2201/128* (2013.01); *B64C 2201/141* (2013.01)

(58) Field of Classification Search
CPC .. G08G 5/0034; G08G 5/0069; B64C 39/024; B64C 2201/127; B64C 2201/128; B64C 2201/141; G05D 1/0088; G05D 1/0202
See application file for complete search history.

(56) References Cited

U.S. PATENT DOCUMENTS 9,262,929 B1    2/2016  Roy et al.
2018/0003816 A1*  1/2018  Olson ................ G01S 13/91

FOREIGN PATENT DOCUMENTS

| CN | 201515494 U | * | 6/2010 |
|---|---|---|---|
| DE | 29701049 U1 | | 4/1997 |
| JP | 2000-342100 A | | 12/2000 |
| JP | 2002-181927 A | | 6/2002 |
| JP | 2004-95967 A | | 3/2004 |
| JP | 2014-180241 A | | 9/2014 |
| JP | 2017-504875 A | | 2/2017 |
| WO | WO 2009/054721 A1 | | 4/2009 |

OTHER PUBLICATIONS

Duan et al., "Pigeon-inspired optimization: a new swarm intelligence optimizer for air robot path planning", International Journal of Intelligent Computing and Cybernetics, vol. 7, No. 1, 2014, pp. 24-37(15 pages).

* cited by examiner

*Primary Examiner* — Hunter B Lonsberry
*Assistant Examiner* — Elizabeth Yang
(74) *Attorney, Agent, or Firm* — Birch, Stewart, Kolasch & Birch, LLP (57) ABSTRACT

A method for flight path planning of unmanned aerial vehicles using flying routes of birds includes: recording multiple pieces of flight data, wherein multiple recording devices are used to record the multiple pieces of flight data when the birds fly from a first designated point to a second designated point and are respectively installed on the birds; generating an optimal flight path, wherein an analyzing device collects the multiple pieces of flight data and calculates the optimal flight path; and controlling a UAV to fly according to the optimal flight path, wherein the optimal flight path is inputted to the UAV. By virtue of bird's nature automatically avoiding obstruction and adapting to wind direction and air flow, multiple obstruction-free recording points between two places can be acquired to form an optimal flight path with the shortest flying time or distance.

10 Claims, 13 Drawing Sheets

| FLGIHT DATA | TIME (H:M:S) | ACCUMULATED TIME (H:M:S) | DISTANCE (km) | ALTITUDE (m) | SPEED (m/Min) |
|---|---|---|---|---|---|
| 1 | 06:59:09 | 00:00:00 | 0 | 9 | 0 |
| 2 | 06:59:24 | 00:00:15 | 0 | 8 | 0 |
| 3 | 06:59:39 | 00:00:30 | 0 | 12 | 0 |
| 4 | 06:59:54 | 00:00:45 | 0.01 | 8 | 0 |
| 5 | 07:00:09 | 00:01:00 | 0.01 | 9 | 0 |
| 6 | 07:00:24 | 00:01:15 | 0.01 | 8 | 0 |
| 7 | 07:00:39 | 00:01:30 | 0.01 | 8 | 0 |
| 8 | 07:00:54 | 00:01:45 | 0.01 | 8 | 0 |
| 9 | 07:01:09 | 00:02:00 | 0.01 | 7 | 0 |
| 10 | 07:01:24 | 00:02:15 | 0.01 | 9 | 0 |
| 11 | 07:01:39 | 00:02:30 | 0.01 | 9 | 0 |
| 12 | 07:01:54 | 00:02:45 | 0.01 | 8 | 0 |
| 13 | 07:02:09 | 00:03:00 | 0.01 | 8 | 0 |
| 14 | 07:02:24 | 00:03:15 | 0.02 | 11 | 0 |
| 15 | 07:02:39 | 00:03:30 | 0.02 | 10 | 0 |
| 16 | 07:02:54 | 00:03:45 | 0.02 | 8 | 0 |
| 17 | 07:05:43 | 00:06:34 | 0.02 | 9 | 0 |
| 18 | 07:08:42 | 00:09:33 | 0.02 | 8 | 0 |
| 19 | 07:11:42 | 00:12:33 | 0.02 | 8 | 0 |
| 20 | 07:14:41 | 00:15:32 | 0.46 | 9 | 144.58 |
| 21 | 07:17:40 | 00:18:31 | 0.72 | 0 | 87.28 |
| 22 | 07:20:40 | 00:21:31 | 0.94 | 25 | 75.6 |
| 23 | 07:23:39 | 00:24:30 | 1.22 | 39 | 94.15 |
| 24 | 07:26:39 | 00:27:30 | 4.15 | 25 | 974.12 |
| 25 | 07:29:40 | 00:30:31 | 7.52 | 53 | 1116.91 |
| 26 | 07:32:39 | 00:33:30 | 11.79 | 78 | 1431.48 |

FIG.4A

| FLGIHT DATA | TIME (H:M:S) | ACCUMULATED TIME (H:M:S) | DISTANCE (km) | ALTITUDE (m) | SPEED (m/Min) |
|---|---|---|---|---|---|
| 27 | 07:35:38 | 00:36:29 | 14.3 | 14 | 844.12 |
| 28 | 07:38:37 | 00:39:28 | 16.8 | 16 | 834.96 |
| 29 | 07:41:35 | 00:42:26 | 18.97 | 42 | 734.41 |
| 30 | 07:44:35 | 00:45:26 | 23.23 | 53 | 1419.62 |
| 31 | 07:47:34 | 00:48:25 | 27.26 | 51 | 1348.93 |
| 32 | 07:50:33 | 00:51:24 | 31.36 | 73 | 1373.6 |
| 33 | 07:53:32 | 00:54:23 | 35.67 | 83 | 1445.97 |
| 34 | 07:56:31 | 00:57:22 | 40.04 | 95 | 1464.82 |
| 35 | 07:59:30 | 01:00:21 | 43.92 | 120 | 1301.18 |
| 36 | 08:02:30 | 01:03:21 | 48.63 | 76 | 1568.48 |
| 37 | 08:05:29 | 01:06:20 | 52.66 | 80 | 1352.58 |
| 38 | 08:08:28 | 01:09:19 | 56.45 | 63 | 1271.09 |
| 39 | 08:11:28 | 01:12:19 | 60.07 | 124 | 1206.05 |
| 40 | 08:14:27 | 01:15:18 | 64.68 | 105 | 1543.76 |
| 41 | 08:17:28 | 01:18:19 | 68.83 | 94 | 1375.89 |
| 42 | 08:20:27 | 01:21:18 | 73.17 | 102 | 1455.4 |
| 43 | 08:23:27 | 01:24:18 | 77.17 | 135 | 1331.96 |
| 44 | 08:26:27 | 01:27:18 | 81.71 | 93 | 1514.01 |
| 45 | 08:29:27 | 01:30:18 | 86.16 | 104 | 1484.67 |
| 46 | 08:32:26 | 01:33:17 | 90.27 | 106 | 1376.05 |
| 47 | 08:35:26 | 01:36:17 | 94.35 | 120 | 1361.13 |
| 48 | 08:38:26 | 01:39:17 | 98.35 | 115 | 1333.11 |
| 49 | 08:41:26 | 01:42:17 | 102.32 | 83 | 1324.75 |
| 50 | 08:44:26 | 01:45:17 | 106.37 | 100 | 1347.33 |
| 51 | 08:50:26 | 01:51:17 | 114.47 | 110 | 1349.79 |
| 52 | 08:53:26 | 01:54:17 | 118.35 | 77 | 1294.32 |
| 53 | 08:56:26 | 01:57:16 | 120.94 | 40 | 867.99 |

| FLGIHT DATA | TIME (H:M:S) | ACCUMULATED TIME (H:M:S) | DISTANCE (km) | ALTITUDE (m) | SPEED (m/Min) |
|---|---|---|---|---|---|
| 1 | 16:17:04 | 00:00:00 | 0 | 162 | 0 |
| 2 | 16:17:06 | 00:00:02 | 0.04 | 164 | 1247.64 |
| 3 | 16:17:08 | 00:00:04 | 0.08 | 164 | 1187.91 |
| 4 | 16:17:10 | 00:00:06 | 0.12 | 162 | 1135.21 |
| 5 | 16:17:12 | 00:00:08 | 0.16 | 160 | 1119.47 |
| 6 | 16:17:14 | 00:00:10 | 0.19 | 159 | 982.59 |
| 7 | 16:17:16 | 00:00:12 | 0.22 | 157 | 887.56 |
| 8 | 16:17:18 | 00:00:14 | 0.25 | 156 | 862.32 |
| 9 | 16:17:20 | 00:00:16 | 0.28 | 154 | 855.18 |
| 10 | 16:17:22 | 00:00:18 | 0.31 | 153 | 932.97 |
| 11 | 16:17:24 | 00:00:20 | 0.33 | 151 | 721.76 |
| 12 | 16:17:26 | 00:00:22 | 0.39 | 149 | 1656.44 |
| 13 | 16:17:28 | 00:00:24 | 0.52 | 147 | 4082.32 |
| 14 | 16:17:32 | 00:00:28 | 0.64 | 142 | 1786.56 |
| 15 | 16:17:34 | 00:00:30 | 0.79 | 150 | 4409.48 |
| 16 | 16:17:36 | 00:00:32 | 0.83 | 153 | 1346.77 |
| 17 | 16:17:38 | 00:00:34 | 0.87 | 152 | 1233.64 |
| 18 | 16:17:40 | 00:00:36 | 0.92 | 155 | 1271.29 |
| 19 | 16:17:42 | 00:00:38 | 0.95 | 160 | 982.99 |
| 20 | 16:17:44 | 00:00:40 | 0.98 | 166 | 839.79 |
| 21 | 16:17:46 | 00:00:42 | 1.01 | 169 | 953.15 |
| 22 | 16:17:48 | 00:00:44 | 1.05 | 171 | 1174.04 |

METHOD FOR FLIGHT PATH PLANNING OF UNMANNED AERIAL VEHICLES USING FLYING ROUTES OF BIRDS

BACKGROUND OF THE INVENTION

1. Field of the Invention

The present invention relates to a method for flight path planning and, more particularly, to a method using racing pigeons that carry recording devices to fly, planning optimal flight paths through calculation using data associated with acquired flight paths, and inputting the optimal flight paths to unmanned aerial vehicles (UAVs) for the UAVs to fly according to the optimal flight paths.

2. Description of the Related Art

Recently, UAVs have become more and more widespread. The high mobility of UAVs is the key point to make them widely acceptable. Given the aerial photogrammetry as an example, an UAV equipped with a camera or video recorder can fly to places that are inaccessible to monitor natural disasters, such as earthquake, volcano eruption, flood or land slide, or to urban areas to keep track of traffic flow, road structure inspection and construction overview of public facilities, so as to acquire sufficient accurate information. Besides, shooting aerial photography of an area in a wide-range fashion facilitates awareness of the changing trend of the area good for policy setting.

UAVs can be used to ship merchandise in another example. The UAVs used to deliver merchandise can avoid streets with traffic jam and directly fly to the designated destination for delivery without being stopped by traffic lights and stop signs, thus providing a time-saving measure for merchandise delivery especially in a long-range delivery.

Existing flight path planning for UAVs is preferably carried out in an open airspace rarely having obstructions standing in the flight path of the UAVs, such that the issue of collision with obstruction during flight can be prevented. However, when UAVs are used in metropolitan areas full of high-rise buildings, obstruction avoidance and wind effect on high-rise buildings become issues thereto. Despite no stoppage caused by traffic jam and traffic lights in an open airspace, UAVs may still encounter other obstructions, such as high-voltage towers, electric wires and cables, electric posts, signs and the like. If colliding with any of the obstructions, UAVs may be out of order and crash and the falling parts or pieces may hit passersby or other objects on the ground to result in hazard to human life or property damage.

To avoid obstruction in the flight, generally, users manually operate the UAVs. When the UAVs encounter an obstruction, users can control the UAVs to make a turn to avoid the obstruction by operating a controller such as a rocker stick. The constraint of such control means resides in a limited distance for connectivity between the UAVs and the controller. When located beyond the limited distance, the UAVs either fail to continuously fly any more or collide with obstructions due to failure of obstruction identification. In consideration of continuous control over the UAVs, users must be located within a maximum connection range with the UAVs. In other words, the criteria for users to keep moving based on movement of the UAVs, which is inconvenient to users, should be met. Meanwhile, line of sight between users and UAVs should be met. Supposing that light of sight between UAVs and users fails to be maintained, even if the UAVs are located within a controllable range, users are still unable to determine the flying direction of the UAVs.

A second method avoiding obstruction is to directly fly to a space above high-rise buildings after departure of the UAVs, such that the UAVs can fly to a space above the destination along a straight line and then descend vertically to effectively avoid obstructions located between buildings. However, if the average height of the buildings is high, the vertical ascending height of the UAVs should increase as well, not only costing more energy but taking more time to fly to the destination. Meanwhile, UAVs encountering unstable air flow in a high-altitude environment are crash-prone.

A third method of flight path planning for UAVs is to install all kinds of environmental sensors on the UAVs, such as infrared (IR) sensors, ultrasonic sensors, lidar (Light Detection and Ranging), and/or camera lens and perform an obstruction-avoiding algorithm. However, such method has a low efficiency as far as cruising radius and flight path planning are concerned.

SUMMARY OF THE INVENTION

An objective of the present invention is to provide a method for flight path planning of unmanned aerial vehicles (UAVs) using flying routes of birds, which employs multiple recording devices respectively installed on multiple racing pigeons to record flying tracks of the racing pigeons between two places, utilizes an analyzing device to identify a most effective and obstruction-free flight path, and inputs the flight path to a UAV for the UAV to effectively and safely fly between the two places.

To achieve the foregoing objective, the method of flight path planning of UAVs using flying routes of birds includes steps of:

recording multiple pieces of flight data, wherein multiple recording devices are used to record the multiple pieces of flight data when the birds fly from a first designated point to a second designated point, and the multiple recording devices are respectively installed on the birds;

generating an optimal flight path, wherein an analyzing device collects the multiple pieces of flight data and calculates the optimal flight path; and controlling a UAV to fly according to the optimal flight path, wherein the optimal flight path is inputted to the UAV.

The present invention adopts the animal instinct of racing pigeons that automatically avoids obstruction during flight to create multiple flying tracks between two places, and selects one most appropriate flying track as the flight path of the UAV. To be the most appropriate flying track, the flying distance or the flying time should be the minimum. Accordingly, the UAV can not only fly without the concern of colliding with obstruction but rapidly arrive at the destination to attain the goal of saving time and cost of consumed energy.

Other objectives, advantages and novel features of the invention will become more apparent from the following detailed description when taken in conjunction with the accompanying drawings.

DETAILED DESCRIPTION OF THE INVENTION

Figure 1:
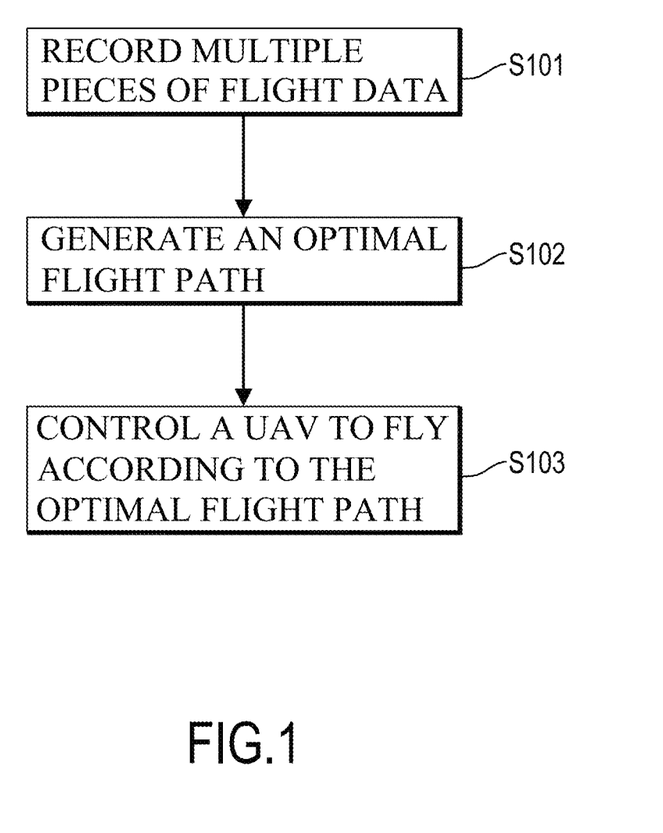
FIG. 1 is a flow diagram of a method of flight path planning of UAVs using flying routes of birds in accordance with the present invention.

With reference to FIG. 1, a method of flight path planning of unmanned aerial vehicles using flying routes of birds in accordance with the present invention includes the following steps.

Step S101: Record multiple pieces of flight data. With simultaneous reference to FIG. 2, firstly multiple recording devices 10 are respectively installed on multiple birds, which may be racing pigeons. Given racing pigeons as an example, the multiple racing pigeons are released from a first designated point and predefine a second designated point as a destination. In an embodiment, each recording device 10 is an electronic foot ring and may configure a fixed time period therein beforehand, which may be 2 seconds or 5 seconds or is adjustable based on users' demands. During the flight of the racing pigeons, the recording devices record one piece of flight data once every the fixed time period in generation of the multiple pieces of flight data, which record latitude, longitude, height, UTC (Coordinated Universal Time), flight direction and flight speed of the racing pigeon at a present location.

Step S102: Generate an optimal flight path. The optimal flight path is generated as follows.

Figure 2:
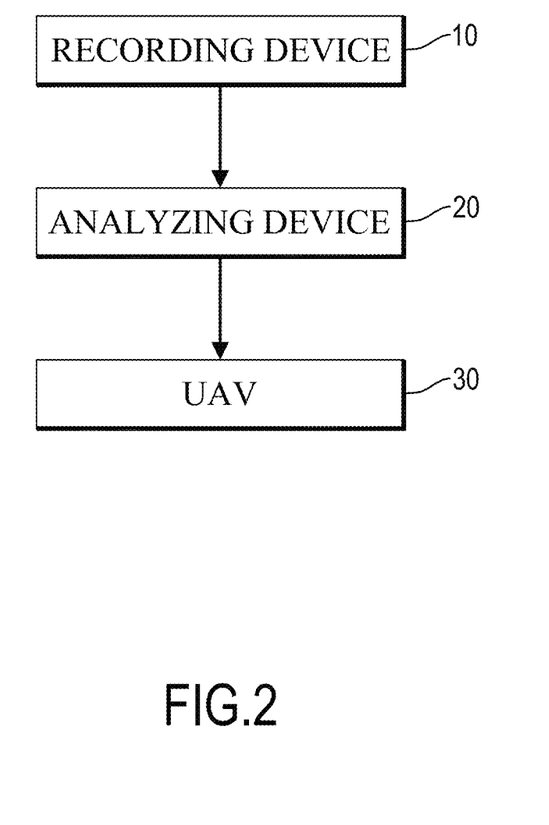
FIG. 2 is a functional block diagram of equipment performing the method in FIG. 1.

Step S211: Generate multiple flying tracks. Given one of the racing pigeons as an example, the racing pigeon will carry one recording device 10 and fly from the first designated point to the second designated point. During the flight of the racing pigeon, the recording device 10 records one piece of flight data every the fixed time period at a data-recording point and outputs the piece of flight data to an analyzing device 20. The analyzing device 20 connects all the data-recording points and groups all the pieces of flight data to generate the flying tracks. In the case of the multiple racing pigeons carrying the respective recording devices 10, the analyzing devices 20 can generate at least one flying track from the respective pieces of flight data.

Step S212: Select an optimal one of the multiple flying tracks as the optimal flight path. In the present embodiment, the analyzing device 20 selects one of the flying tracks of the racing pigeons with the shortest flying time as the optimal flight path. Alternatively, the analyzing device 20 selects one of the flying tracks of the racing pigeons with the shortest flying distance as the optimal flight path.

Another way of establishing the at least one optimal flight path is as follows.

Step S221: Acquire multiple pieces of optimal flight data. The analyzing device 20 calculates a shortest distance between the first designated point and the second designated point, connects the first designated point and the second designated point with the shortest distance as a shortest path, and selects the pieces of flight data closest to the shortest path as the multiple pieces of optimal flight data.

Step S222: Acquire the optimal flight path. The multiple pieces of optimal flight data are grouped to form the optimal flight path.

Step S103: Control a UAV 30 to fly according to the optimal flight path. The optimal flight path is acquired from Step S102 and is inputted into the UAV 30 for the UAV 30 to fly between the first designated point and the second designated point according to the optimal flight path.

Figure 3:
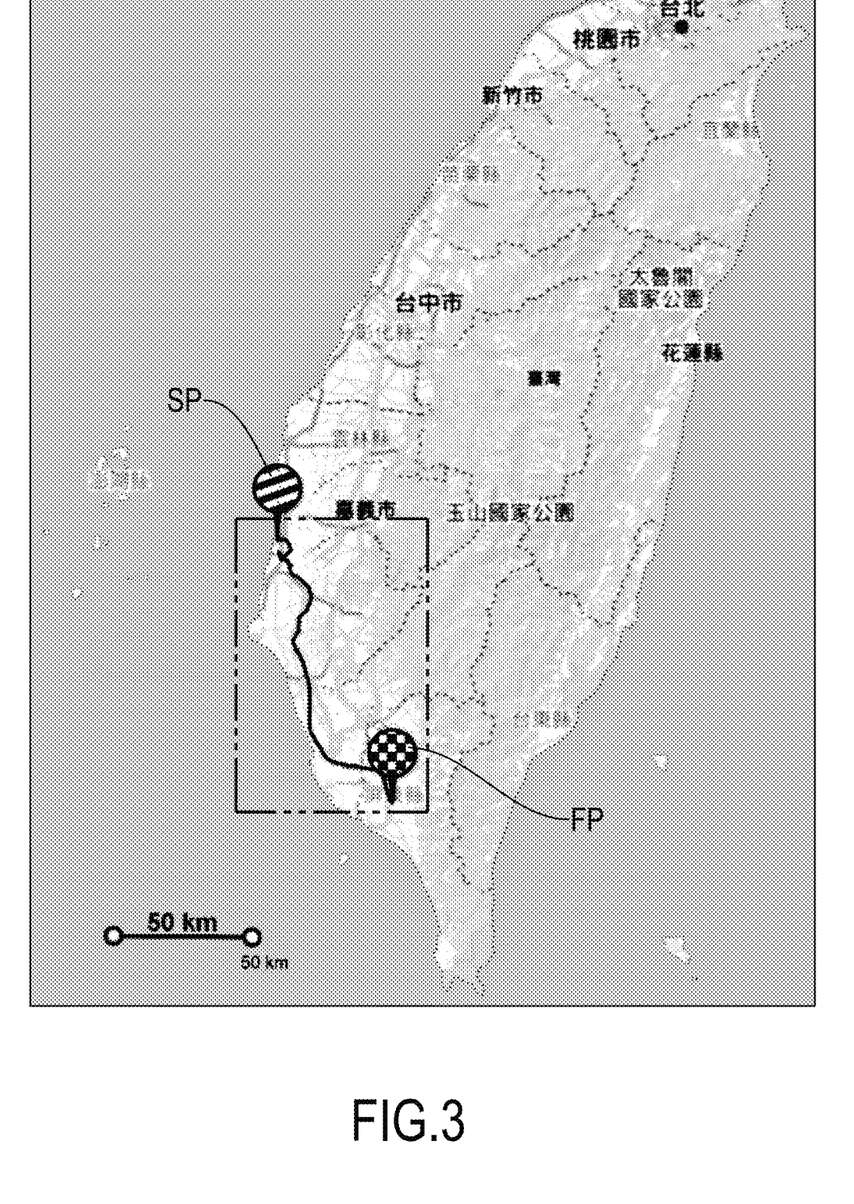
FIG. 3 is a schematic diagram of a flying track in accordance with the present invention.
Figure 4A:
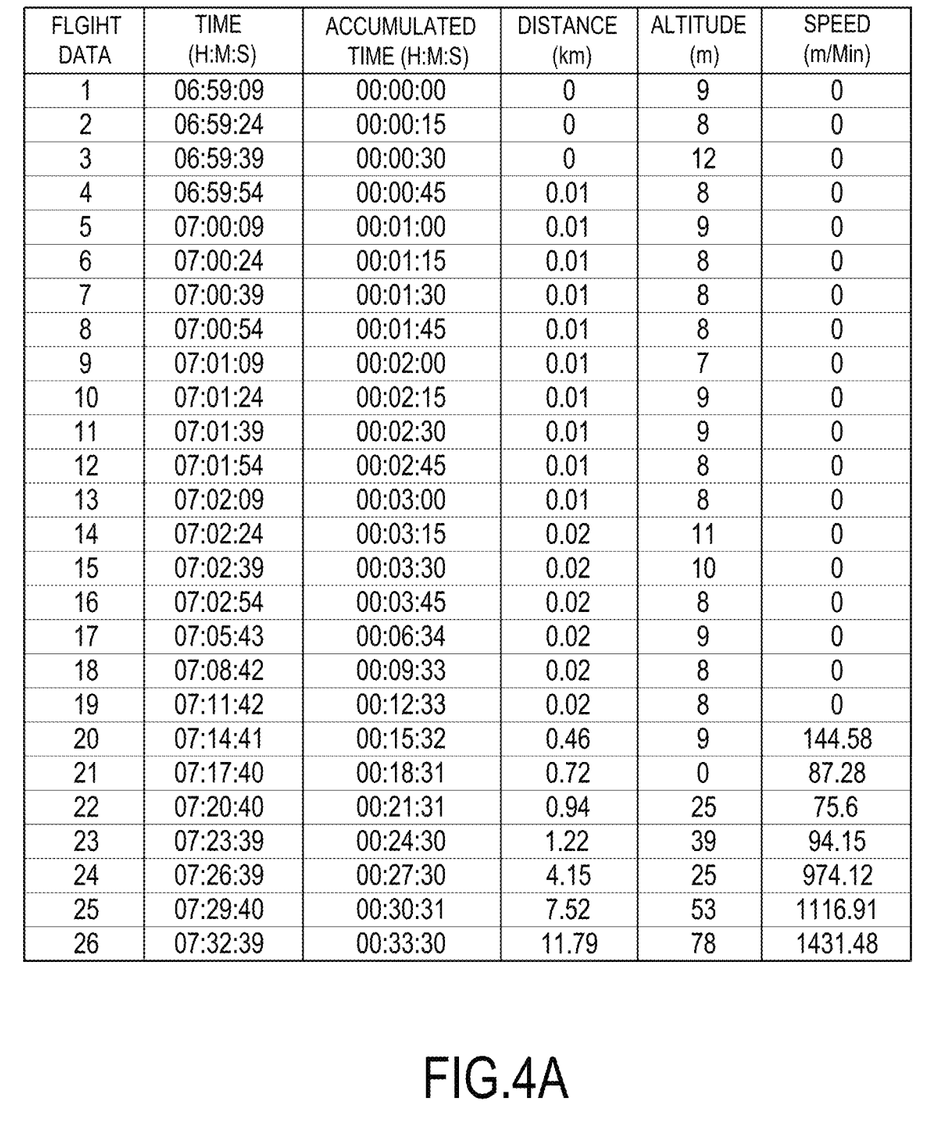
FIG. 4A is a chart of first flight data associated with the flying track in FIG. 3.

Under the circumstance of a large-range flying distance, with reference to FIG. 3, an actual flying track for the racing pigeons to fly from the first designated point SP to the second designated point FP is shown. Before departure of a racing pigeon, the fixed time period is preset to be 15 seconds. With reference to FIG. 4A, as shown in the pieces of flight data, when the racing pigeon carrying the recording device 10 flies to a first data-recording point DP1, the recording device 10 records a first piece of flight data DATA1 at the first data-recording point DP1, and a recording time and a height of the first piece of flight data DATA1 are 6'59"09 and 9 meters respectively. The racing pigeon flies to a second data-recording point DP2 15 seconds later. The recording device 10 records a second piece of flight data DATA2 at the second data-recording point DP2, and the recording time and the height of the second piece of flight data DATA2 are 6'59"24 and 8 meters respectively. As reflected by the first piece of flight data DATA1 and the second piece of flight data DATA2, the racing pigeon is in a non-flying state.

Figure 4B:
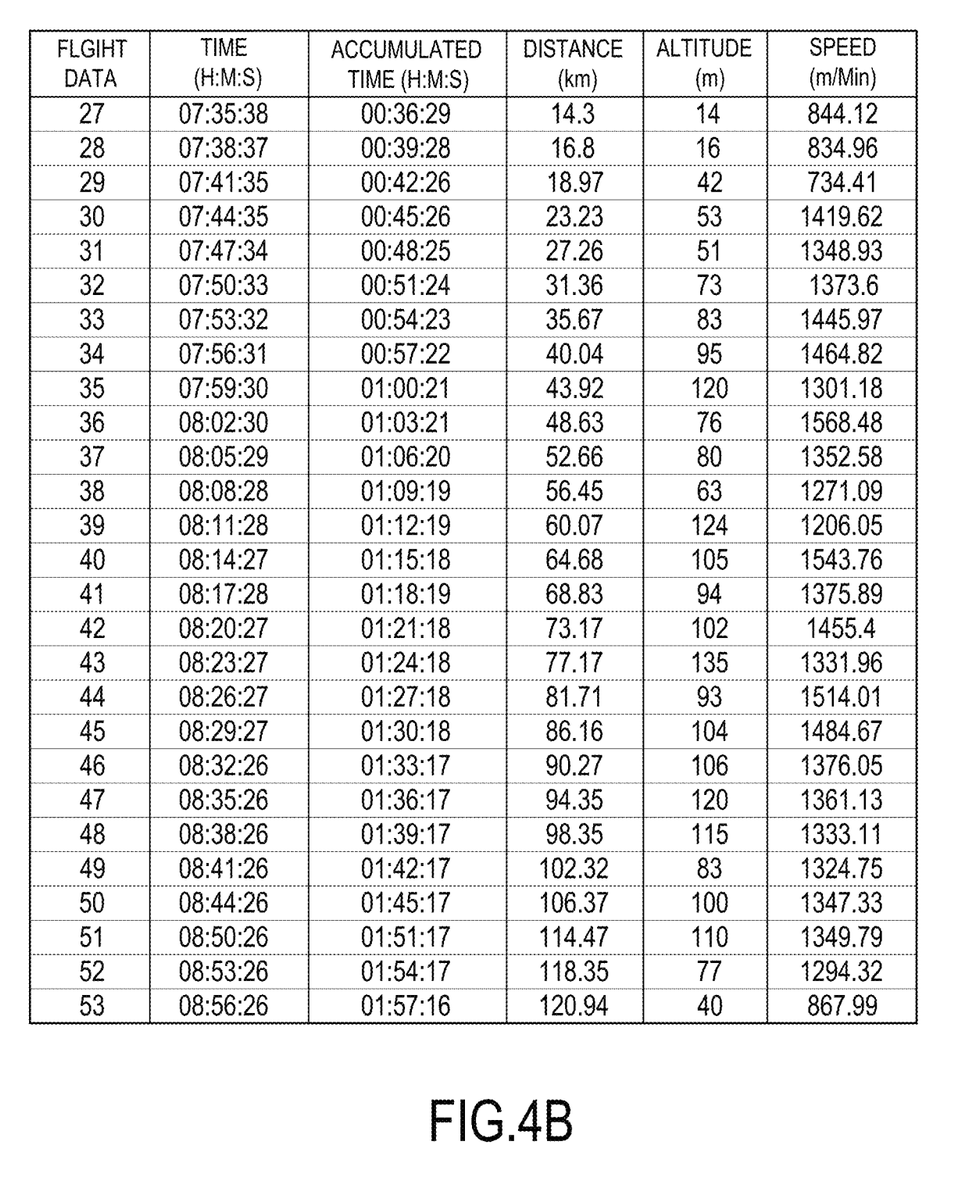
FIG. 4B is a chart of the remaining first flight data.
Figure 5:
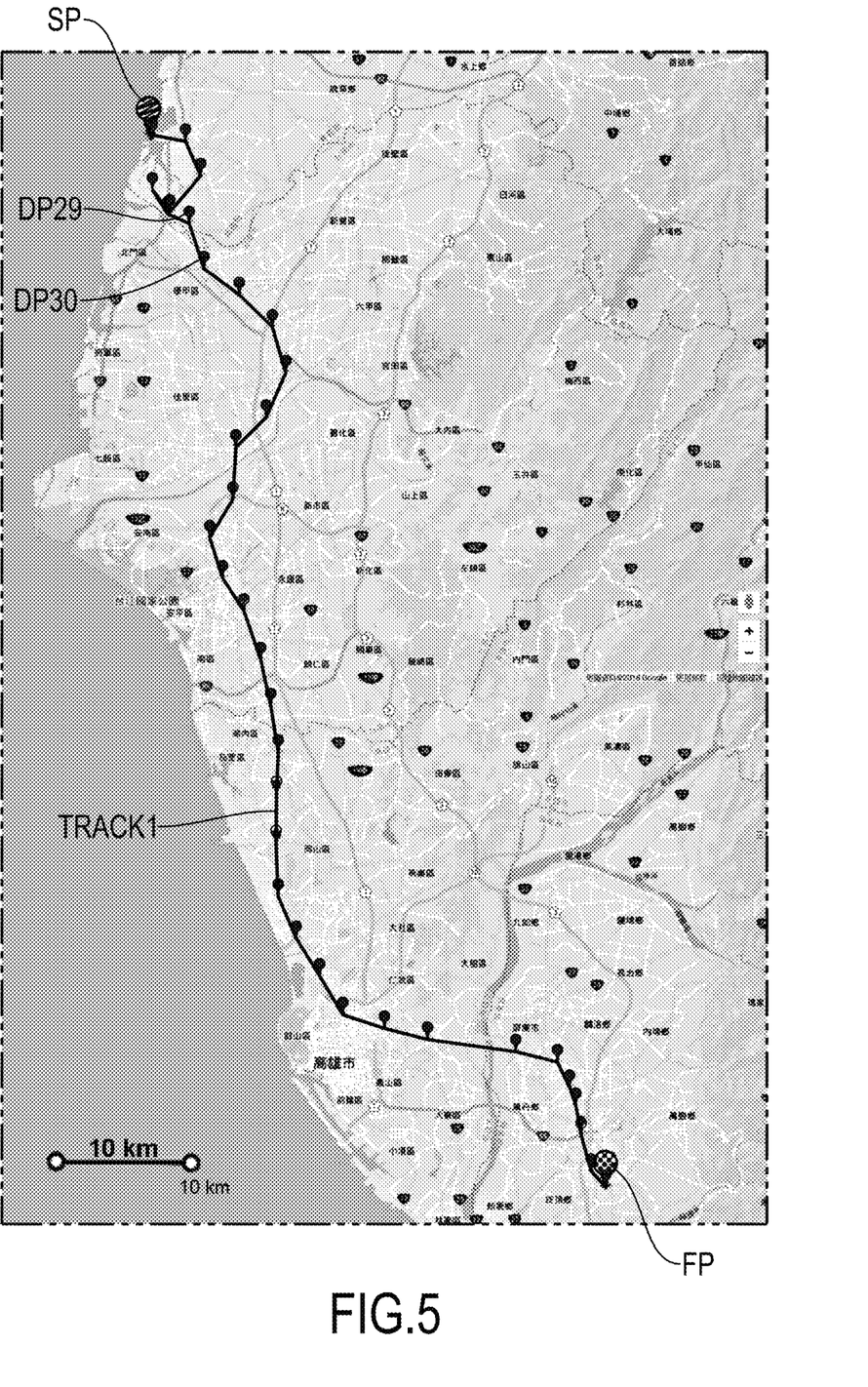
FIG. 5 is a partially enlarged schematic diagram of FIG. 3 having the flying track.

With reference to FIGS. 4B and 5, when the racing pigeon flies to a twenty-ninth data-recording point DP29, the recording device 10 also records a twenty-ninth piece of flight data at the twenty-ninth data-recording point DP29. The recording time, a distance from the departure point, the height, and a speed associated with the twenty-ninth data-recording point DP29 are 42'26, 18.97 kilometers, 42 meters and 734.41 meters/minute respectively. When the racing pigeon flies to a thirtieth data-recording point DP30, the recording device 10 also records a thirtieth piece of flight data at the thirtieth data-recording point DP30. The recording time, a distance from the departure point, the height, and a speed associated with the thirtieth data-recording point DP30 are 45'26, 23.23 kilometers, 53 meters and 1419.62 meters/minute respectively. By way of recording all data-recording points from the first designated point SP as mentioned earlier, the analyzing device 20 can group data associated with all data-recording points to constitute a first flying track TRACK1.

Figure 6:
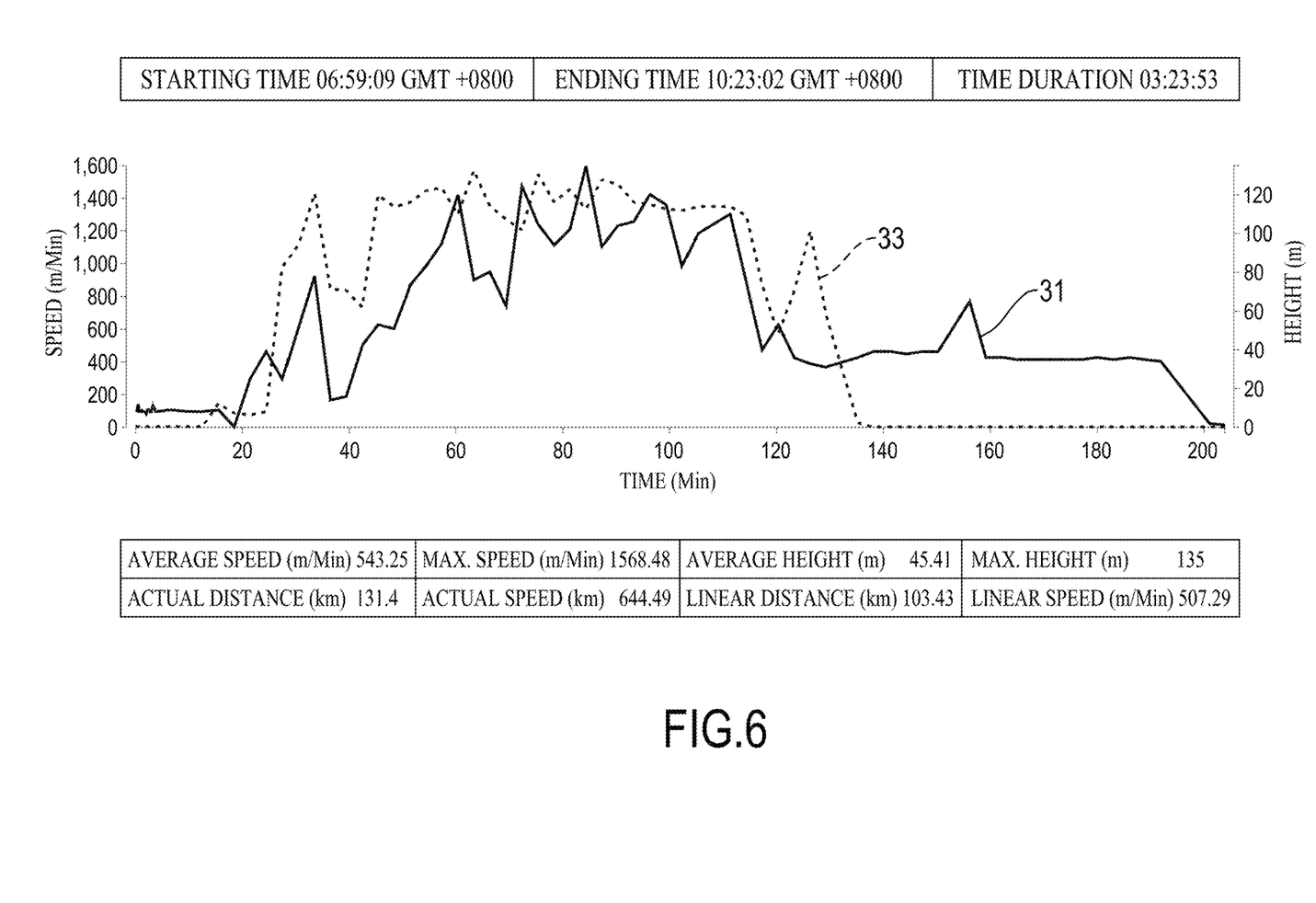
FIG. 6 is a trending diagram of the first flight data in FIGS. 4A and 4B.

With reference to FIG. 6, after analyzing all the pieces of flight data associated with all data-recording points at the first flying track TRACK1, the analyzing device 20 outputs a first flight speed curve 31 and a first flight height curve 32 and calculates multiple pieces of advanced data. Each piece of advanced data includes an average flight speed, a maximum flight speed per hour, an average flight height, and the like.

Figure 7A:
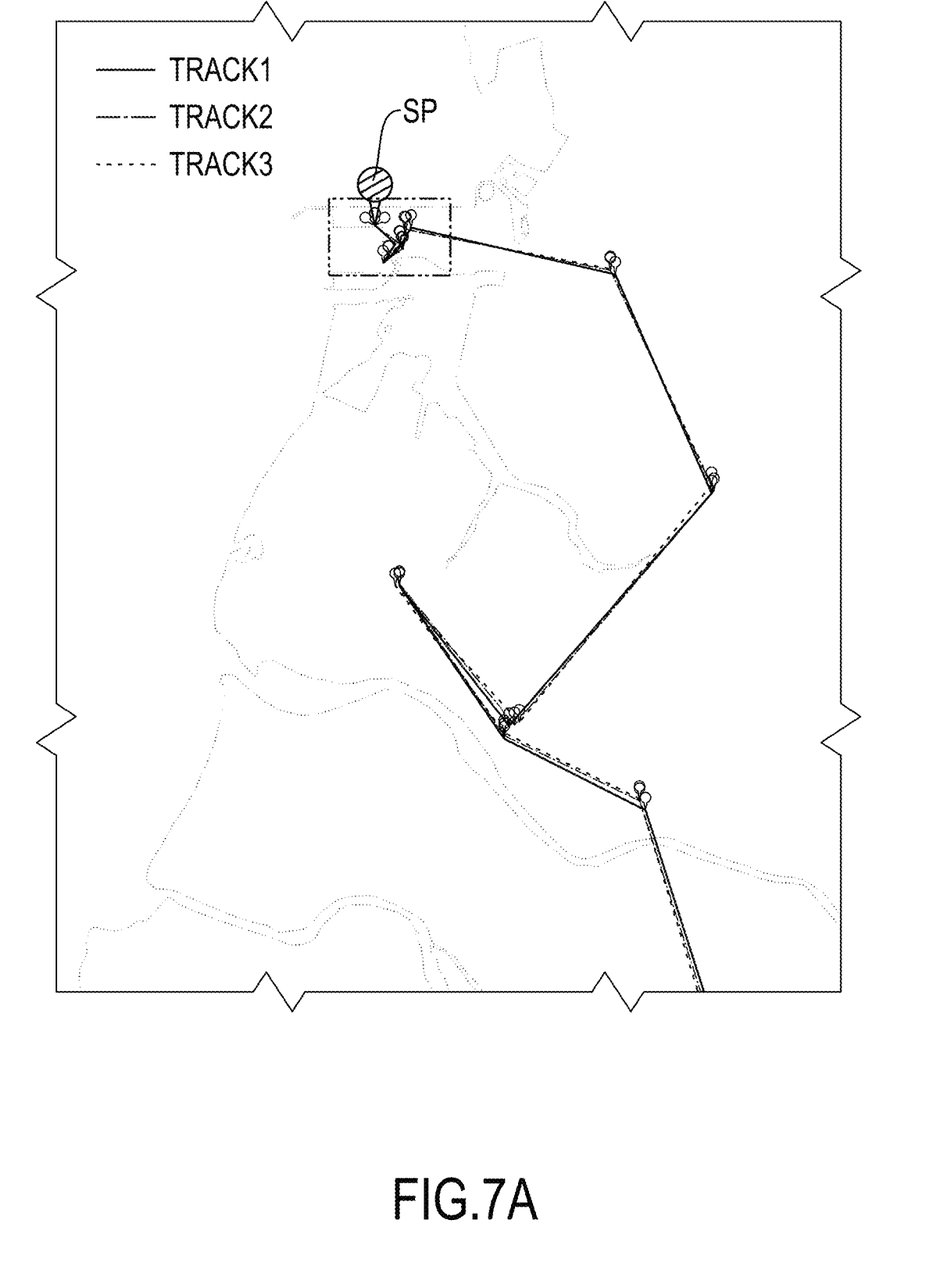
FIG. 7A is a schematic diagram showing a first flight path, a second flight path and a third flight path superimposed on each other in accordance with the present invention.
Figure 7B:
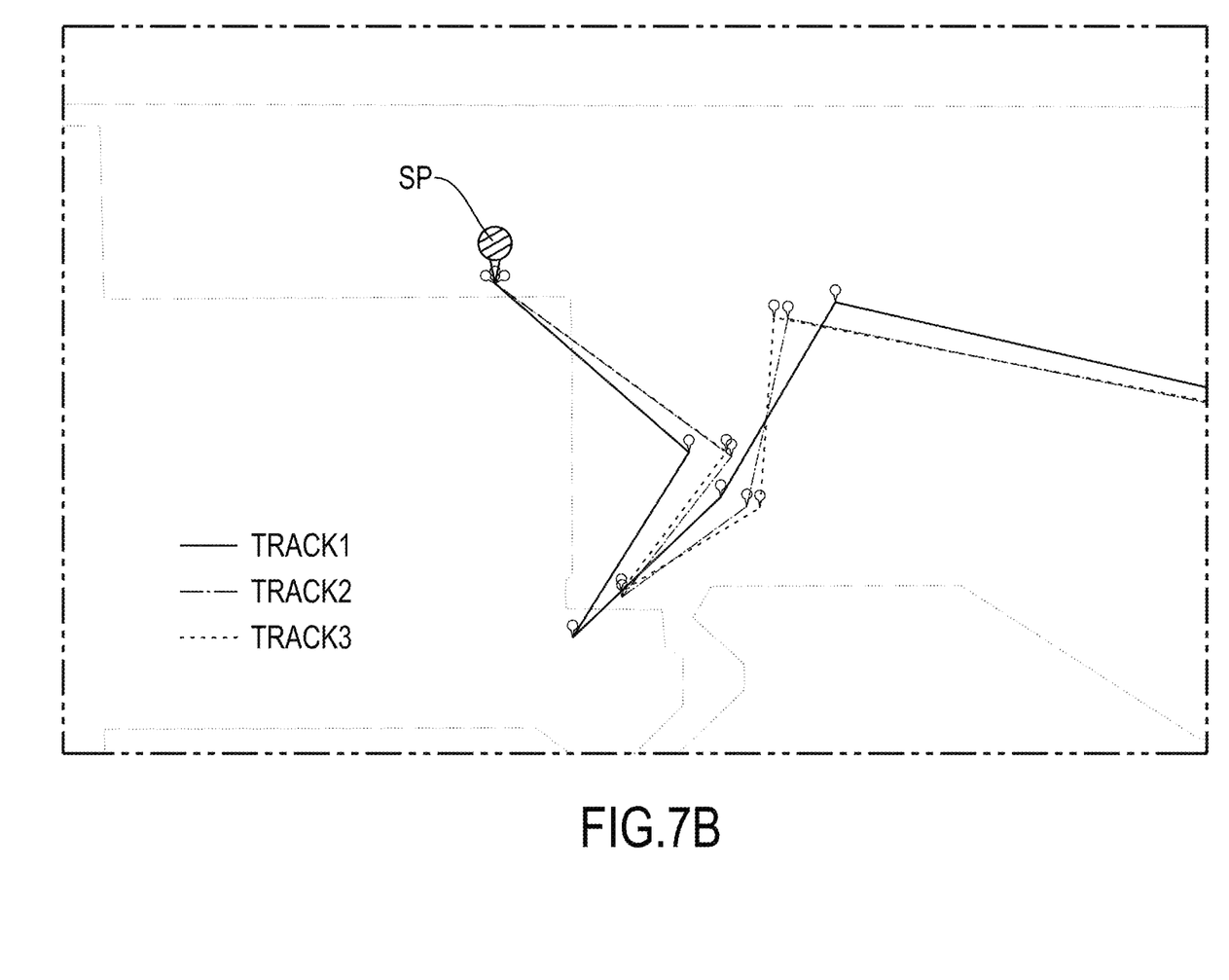
FIG. 7B is a partially enlarged schematic diagram of FIG. 7A.

With reference to FIG. 7A, the multiple pieces of flight data recorded by the recording device 10 carried by each different racing pigeon are grouped by the analyzing device 20 to generate multiple flying tracks respectively. In the present embodiment, there are three flying tracks, namely a first flying track TRACK1, a second flying track TRACK2, and a third flying track TRACK3. With reference to FIG. 7B, after the first flying track TRACK1, the second flying track TRACK2 and the third flying track TRACK3 are superimposed on one another, so it can tell that all the flying tracks TRACK1, TRACK2, TRACK3 differ to a certain extent. The flying track with a shortest flying distance is taken as an optimal flight path. Thus, in the present embodiment, as the first flying track TRACK1 has the shortest flying distance, all the pieces of flight data associated with the first flying track TRACK1 are inputted to the UAV for the UAV to fly according to the optimal flight path.

Figure 8:
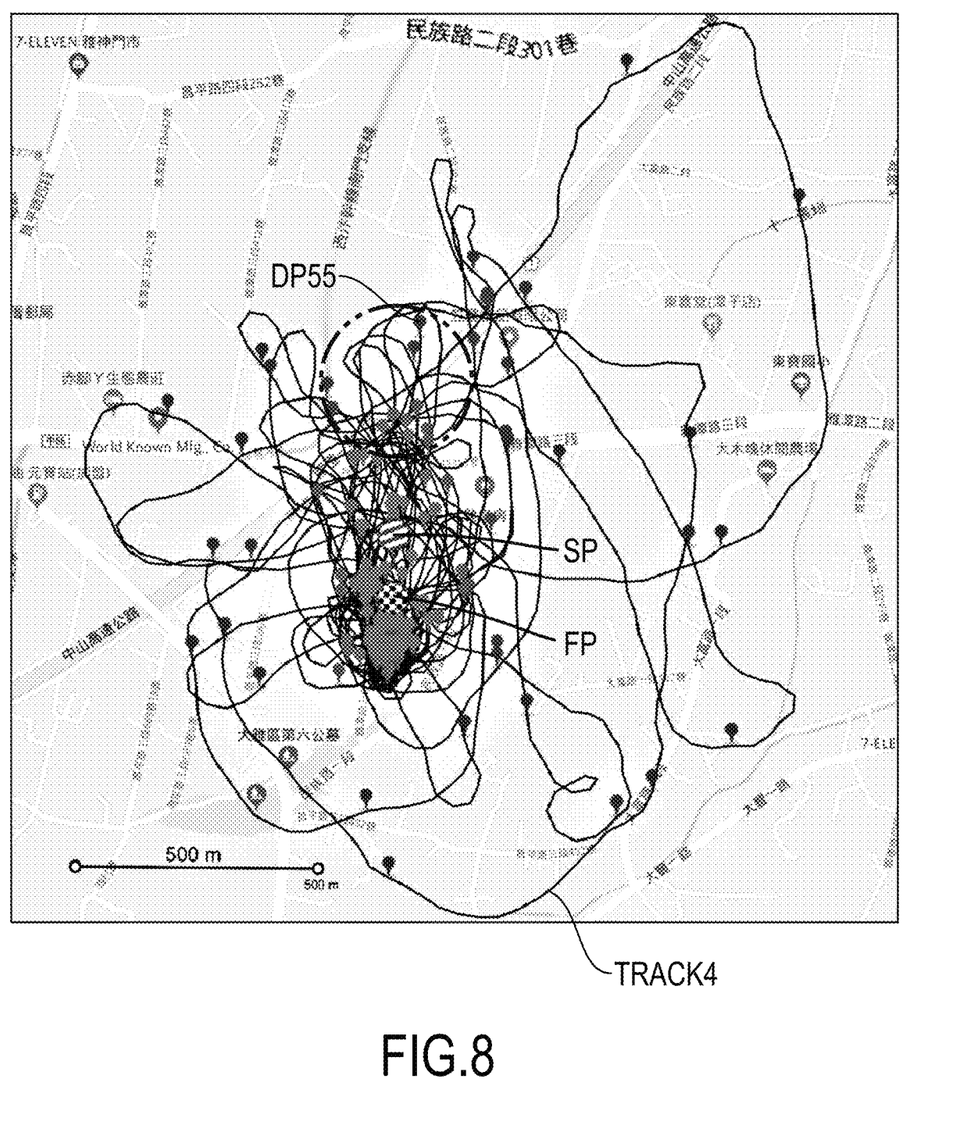
FIG. 8 is a schematic diagram of a fourth flight path in accordance with the present invention.
Figure 9:
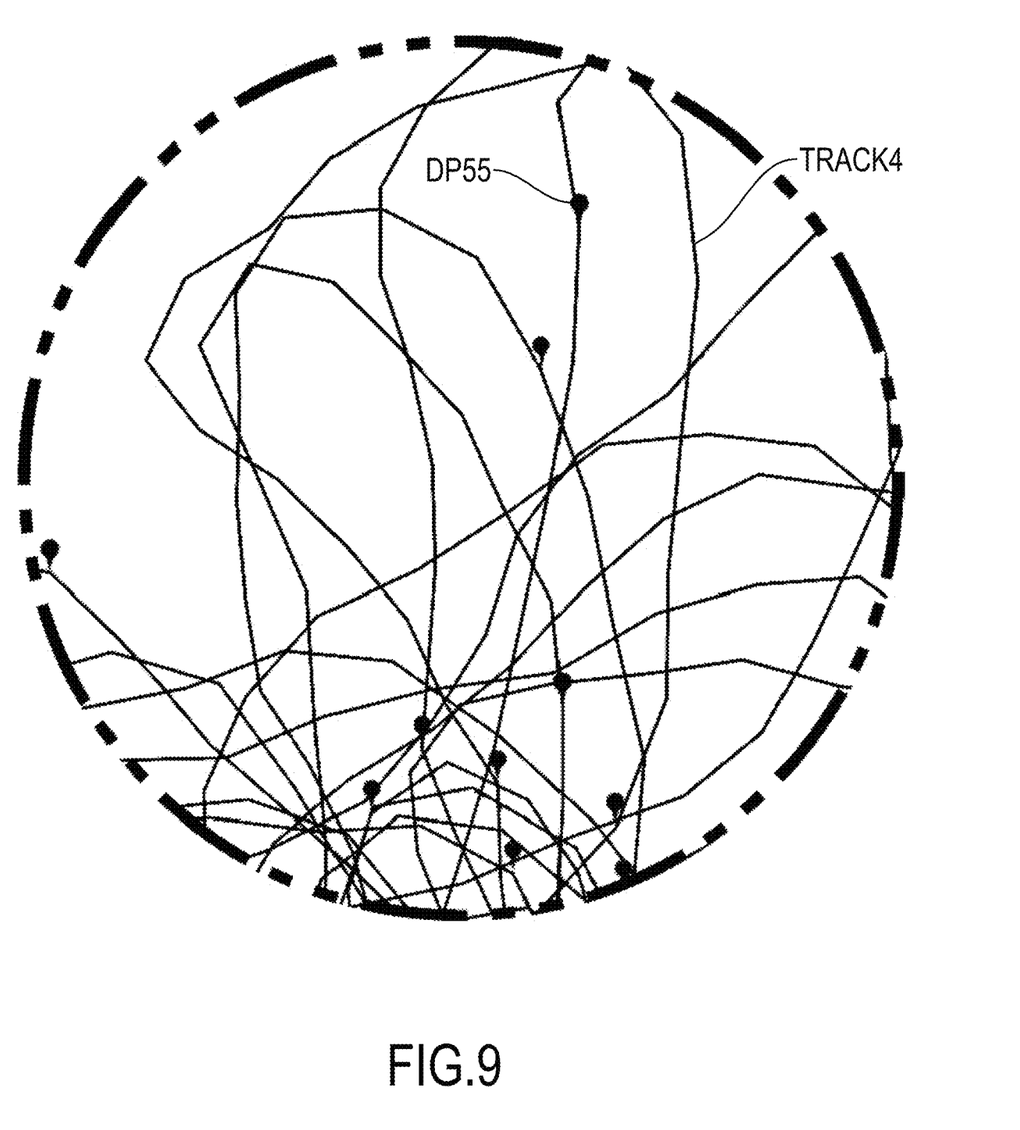
FIG. 9 is a partially enlarged schematic diagram of FIG. 8.
Figure 10:
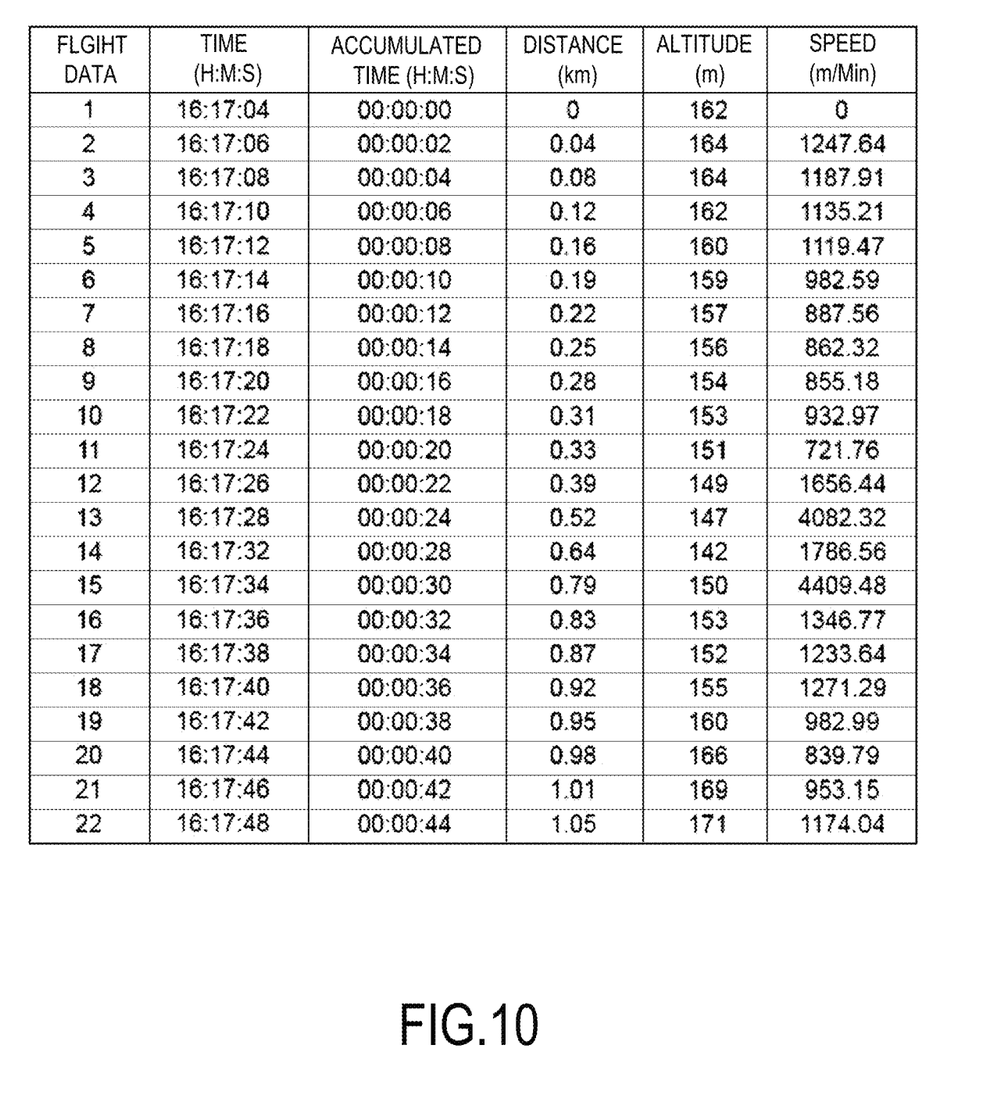
FIG. 10 is a chart of second flight data associated with the fourth flight path in FIGS. 8 and 9.
Figure 11:
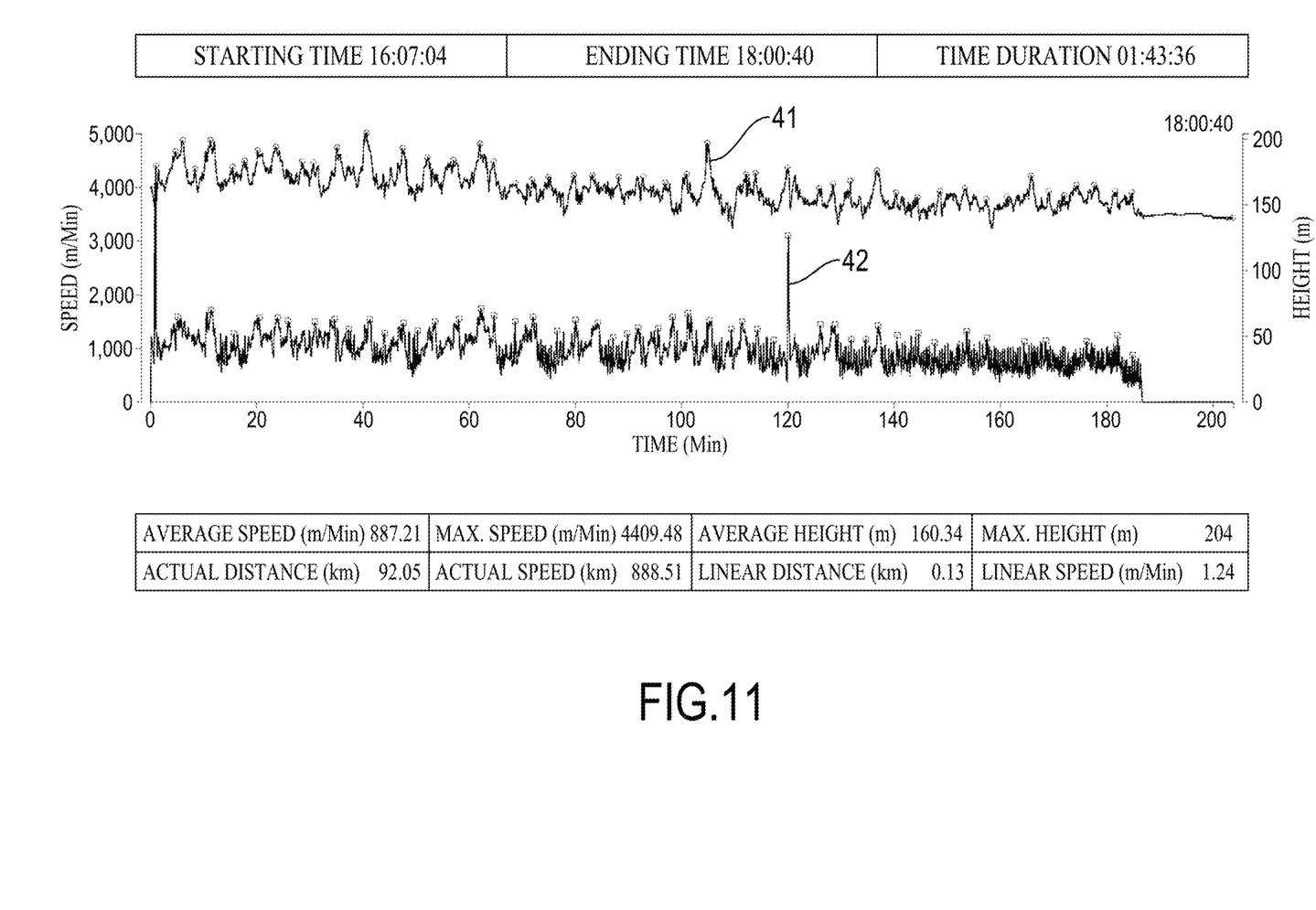
FIG. 11 is a trending diagram of the second flight data in FIG. 10.

In the case of a small-range flying distance, with reference to FIGS. 8 and 9, each racing pigeon carrying the recording device 10 flies from the first designated point SP to the second designated point FP in an urban area, and the recording device 10 records the piece of flight data at each data-recording point, such as a fifty-fifth piece of flight data DATA55 at a fifty-fifth data-recording point DP55. With reference to FIGS. 10 and 11, after analyzing and collecting the piece of flight data at each data-recording point, the analyzing device 20 outputs multiple pieces of second flight data to a trending diagram. The trending diagram includes a second flight height curve 41 and a second flight speed curve 42 associated with the multiple pieces of second flight data.

The feature of automatically avoiding obstruction during flight of racing pigeons allow large amount of racing pigeons carrying the recording devices 10 to fly from the first designated point SP to the second designated point FP for acquisition of an optimal flight path, such that the optimal flight path can be inputted into a UAV for the UAV to fly according to the optimal flight path, not only significantly lowering the chance of colliding with obstruction during flight but saving time and cost of energy consumption because of shortened flying time and distance. In consideration of flight in a concrete jungle, supposing that a UAV needs to fly from the first floor of a building at one urban area to the tenth floor of another building just three blocks away, the capability of avoiding obstruction during flight becomes critical, and it is beneficial to apply the method of flight path planning of UAVs using flying routes of birds in accordance with the present invention in an urban area full of obstructions.

Furthermore, lots of racing pigeons carrying the respective recording devices 10 are allowed to fly between two different points in an area. As racing pigeons usually fly in a safe and obstruction-free airspace, those data-recording points recorded by the recording device 10 are also locations to which UAVs can fly to and can be grouped to create an obstruction-free airspace in the area, which includes all the data-recording points safely accessible to all the racing pigeons. When UAVs need to fly from the first designated point SP to the second designated point FP, the analyzing device 20 can be used to pick all the data-recording points that form the shortest path between the first designated point SP to the second designated point FP and then input those data-recording points to the UAVs for the UAVs to safely and rapidly fly from the first designated point SP to the second designated point FP, ensuring that the UAVs are not damaged due to collision with obstruction during the flight.

Additionally, in view of high efficiency and low cost in collecting data associated with flight paths of birds, timely update of flight path planning and safe airspace can be performed based on seasonal and environmental variation to ensure that flight safety and performance of UAVs can be secured and the effect of economical energy can be achieved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of flight path planning of UAVs (Unmanned Aerial Vehicles) using flying routes of birds, comprising steps of:
   (a) recording multiple pieces of flight data, wherein multiple recording devices are used to record the multiple pieces of flight data when the birds fly from a first designated point to a second designated point, and the multiple recording devices are respectively installed on the birds;
   (b) generating an optimal flight path, wherein an analyzing device collects the multiple pieces of flight data and calculates the optimal flight path; and
   (c) controlling a UAV to fly according to the optimal flight path, wherein the optimal flight path is inputted to the UAV.

2. The method as claimed in claim 1, wherein in the step (a) each recording device records latitude, longitude, height, UTC (Coordinated Universal Time), flight direction and flight speed of a corresponding bird at present every a preset fixed time period.

3. The method as claimed in claim 2, wherein step (b) further comprises steps of:
   (b11) generating multiple flying tracks, wherein the analyzing device connects multiple data-recording points and groups the multiple pieces of flight data recorded by the recording device at the respective data-recording points to generate the multiple flying tracks; and
   (b12) selecting an optimal one of the multiple flying tracks as the optimal flight path, wherein the analyzing device selects one of the multiple flying tracks with a shortest flying distance or a shortest flying time as the optimal flight path.

4. The method as claimed in claim 2, wherein step (b) further comprises steps of:
   (b21) acquiring multiple pieces of optimal flight data, wherein the analyzing device calculates a shortest distance between the first designated point and the second designated point, connects the first designated point and the second designated point with the shortest distance as a shortest path, and selects the pieces of flight data closest to the shortest path as the multiple pieces of optimal flight data; and
   (b22) acquiring the optimal flight path, wherein the multiple pieces of optimal flight data are grouped to form the optimal flight path.

5. The method as claimed in claim 3, wherein the recording device is an electronic foot ring for the birds.

6. The method as claimed in claim 4, wherein the recording device is an electronic foot ring for the birds.

7. The method as claimed in claim 5, wherein the step (a) further comprises a step of creating an obstruction-free airspace in an area, wherein the multiple data-recording points recorded by the recording device are locations accessible to the birds.

8. The method as claimed in claim 6, wherein the step (a) further comprises a step of creating an obstruction-free airspace in an area, wherein the multiple data-recording points recorded by the recording device are locations accessible to the birds.

9. The method as claimed in claim 7, wherein the birds are racing pigeons.

10. The method as claimed in claim 8, wherein the birds are racing pigeons.

* * * * *